(12) United States Patent
Wang et al.

(10) Patent No.: US 10,968,361 B2
(45) Date of Patent: Apr. 6, 2021

(54) LONG-ACTING SUPER-HYDROPHOBIC COATING RESISTANT TO WATER PRESSURE IMPACT AND PREPARATION METHOD THEREOF

(71) Applicant: NORTHEAST PETROLEUM UNIVERSITY, Daqing (CN)

(72) Inventors: Huaiyuan Wang, Daqing (CN); Zhanjian Liu, Daqing (CN); Xiguang Zhang, Daqing (CN); Yanji Zhu, Daqing (CN); Chijia Wang, Daqing (CN); Chongjiang Lv, Daqing (CN)

(73) Assignee: NORTHEAST PETROLEUM UNIVERSITY, Daqing (CN)

( * ) Notice: Subject to any disclaimer, the term of this patent is extended or adjusted under 35 U.S.C. 154(b) by 68 days.

(21) Appl. No.: 16/248,751

(22) Filed: Jan. 15, 2019

(65) Prior Publication Data
US 2019/0153255 A1    May 23, 2019

Related U.S. Application Data

(63) Continuation of application No. PCT/CN2016/097581, filed on Aug. 31, 2016.

(51) Int. Cl.
| | | |
|---|---|---|
| *C09D 127/16* | (2006.01) |
| *C09D 163/00* | (2006.01) |
| *C09D 7/65* | (2018.01) |
| *C09D 7/61* | (2018.01) |
| *C09D 7/63* | (2018.01) |
| *C09D 5/00* | (2006.01) |

(Continued)

(52) U.S. Cl.
CPC ............. *C09D 127/16* (2013.01); *C09D 5/00* (2013.01); *C09D 7/61* (2018.01); *C09D 7/63* (2018.01);

(Continued)

(58) Field of Classification Search
CPC .......... C09D 127/16; C09D 7/65; C09D 7/61; C09D 7/63; C09D 5/00; C09D 177/00; C09D 163/00; C09D 181/06
See application file for complete search history.

(56) References Cited

FOREIGN PATENT DOCUMENTS

| CN | 103820945 A | 5/2014 |
|---|---|---|
| CN | 104358107 A | 2/2015 |

(Continued)

OTHER PUBLICATIONS

Wen et al., Superhydrophobic to Icephobic Properties of Micro/Nano-Structure Composite Surface, Chemical Journal of Chinese Universities, May 31, 2014, vol. 35, No. 5.

(Continued)

*Primary Examiner* — John E Uselding (57) ABSTRACT

A long-acting super-hydrophobic coating resistant to water pressure impact and preparation method thereof. The long-acting super-hydrophobic coating includes a conductive substrate and the following raw materials in parts by weight: 1 part to 10 parts of titanium source or zinc source, 40 parts to 100 parts of deionized water, 20 parts to 50 parts of hydrochloric acid or 20 parts to 40 parts of sodium hydroxide, 1 part to 10 parts of electrolyte, 1 part to 10 parts of low surface energy modifier, 10 parts to 20 parts of high molecular polymer, 1 part to 5 parts of carbon nanotube and 70 parts to 100 parts of organic solvent. The long-acting super-hydrophobic coating has an organic-inorganic nano-interpenetrating network structure, which improves the stability of the multi-stage nano-micro structure, so that the super-hydrophobic coating surface has a good high-pressure water impact resistance and high-pressure static water resistance.

21 Claims, 4 Drawing Sheets

(51) Int. Cl.
*C09D 177/00* (2006.01)
*C09D 181/06* (2006.01)
*C08K 3/28* (2006.01)
*C08K 3/08* (2006.01)
*C08K 3/30* (2006.01)
*C08K 5/098* (2006.01)
*C08K 3/24* (2006.01)
*C08K 5/092* (2006.01)
*C08K 3/04* (2006.01)
*C08K 3/16* (2006.01)
*C08K 5/00* (2006.01)
*C08K 5/07* (2006.01)
*C08K 5/20* (2006.01)
*C08L 83/04* (2006.01)

(52) U.S. Cl.
CPC .............. *C09D 7/65* (2018.01); *C09D 163/00* (2013.01); *C09D 177/00* (2013.01); *C09D 181/06* (2013.01); *C08K 3/041* (2017.05); *C08K 3/16* (2013.01); *C08K 3/24* (2013.01); *C08K 3/28* (2013.01); *C08K 5/0091* (2013.01); *C08K 5/07* (2013.01); *C08K 5/092* (2013.01); *C08K 5/098* (2013.01); *C08K 5/20* (2013.01); *C08K 2003/0881* (2013.01); *C08K 2003/0893* (2013.01); *C08K 2003/309* (2013.01); *C08L 83/04* (2013.01)

(56) References Cited

FOREIGN PATENT DOCUMENTS

CN 104371498 A 2/2015
CN 105016935 A 11/2015

OTHER PUBLICATIONS

Yang et al., Study on Hydrophobicity of ZnO Submicron Rod Film Decorated by Linear Low Density Polyethylene Coating, Chinese Science Bulletin, Apr. 30, 2017, vol. 52, No. 7.

LONG-ACTING SUPER-HYDROPHOBIC COATING RESISTANT TO WATER PRESSURE IMPACT AND PREPARATION METHOD THEREOF

RELATED APPLICATION

The application is a continuation application of the international application PCT/CN2016/097581 filed Aug. 31, 2016, which is incorporated herein by reference in its entirety.

FIELD OF THE INVENTION

The present invention relates to a long-acting super-hydrophobic coating resistant to water pressure impact and preparation method thereof.

BACKGROUND OF THE INVENTION

In recent years, the super-hydrophobic surface prepared by inspiration of the hydrophobic surface in nature has become a research hotspot in scientific research and industrial production due to its good anti-corrosion, wear-resistance, drag reduction and self-cleaning properties, and the like.

It has been found that the wettability of solid surfaces is mainly co-determined by the microscopic morphology and chemical composition of the surface. Therefore, a super-hydrophobic surface can be prepared by a method of regulating the microstructure and chemical composition of a solid surface.

So far, artificial super-hydrophobic surfaces have been successfully prepared by various methods, however, the fluids in practical applications generally have a certain flow velocity and pressure. When the ordinary super-hydrophobic surface is in contact with the fluid for a long time, the fluid will wet the super-hydrophobic surface, resulting in losing its super-hydrophobic properties. Therefore, it is of great research significance and industrial application value to prepare a surface which has stable super-hydrophobicity under long-term contact with water pressure.

It is well known that the hydrophobic stability of super-hydrophobic surfaces is primarily dependent on the gas film formed by the air that is trapped by the nano-micro structures of the surface. The gas film can not only reduce the contact area between the solid surface and the liquid surface, but also reduce the adhesion of the solid surface to the liquid. Most of the super-hydrophobic surfaces currently reported will be wetted by the fluid due to the gas films on their surfaces lose quickly when they are in contact with the actual pressurized flowing fluid, thereby losing their super-hydrophobic properties. Therefore, how to construct a special multi-stage structure on a solid surface to form a stable gas film, so that the coating can withstand pressure and dynamic fluid flow to maintain long-lasting super-hydrophobic properties, becomes the key to improve the stability of the super-hydrophobic surface.

OBJECTS AND SUMMARY OF THE INVENTION

The embodiment of the present invention provides a super-hydrophobic coating having resistance to temperature and water pressure impact and preparation method thereof.

The technical solution of the embodiment of the present invention is implemented as follows:

A long-acting super-hydrophobic coating resistant to water pressure impact according to the present invention comprising a conductive substrate, which further comprises the following raw materials in parts by weight: 1 part to 10 parts of titanium source or 1 part to 10 parts of zinc source, 40 parts to 100 parts of deionized water, 20 parts to 50 parts of hydrochloric acid or 20 parts to 40 parts of sodium hydroxide, 1 part to 10 parts of electrolyte, 1 part to 10 parts of low surface energy modifier, 10 parts to 20 parts of high molecular polymer, 1 part to 5 parts of carbon nanotube and 70 parts to 100 parts of organic solvent.

The long-acting super-hydrophobic coating with water-pressure impact resistance according to the present invention has a special organic-inorganic nano-interpenetrating network structure, which greatly improves the stability of the multi-stage nano-micro structure, so that the super-hydrophobic coating surface has a good high pressure water impact resistance and high pressure static water resistance.

Further, a long-acting super-hydrophobic coating resistant to water pressure impact according to the present invention comprises the following raw materials in parts by weight: 4 parts of titanium source or 4 parts of zinc source, 48 parts of deionized water, 48 parts of hydrochloric acid or 48 parts of sodium hydroxide, 8 parts of electrolyte, 3 parts of low surface energy modifier, 15 parts of high molecular polymer, 2 parts of carbon nanotube and 85 parts of organic solvent.

Further, a long-acting super-hydrophobic coating resistant to water pressure impact according to the present invention comprises the following raw materials in parts by weight: 3 parts of titanium source or 3 parts of zinc source, 68 parts of deionized water, 23 parts of hydrochloric acid or 23 parts of sodium hydroxide, 5 parts of electrolyte, 7 parts of low surface energy modifier, 13 parts of high molecular polymer, 4 parts of carbon nanotube and 78 parts of organic solvent.

Further, the conductive substrate comprises FTO conductive glass, ITO conductive glass, aluminum sheet or silicon wafer.

Further, the low surface energy modifier is at least one of perfluorosilane, perfluorooctanoic acid, dimethicone, tetradecanoic acid, hexadecanoic acid, stearic acid, and octadecylamine.

Further, the titanium source at least comprises one of titanium tetrachloride, butyl titanate or titanium isopropoxide, the zinc source at least comprises one of zinc acetate or zinc nitrate.

Further, the electrolyte is one or more of sulfuric acid, oxalic acid, and chromic acid.

Further, the high molecular polymer at least comprises one of polyvinylidene fluoride, polysulfone, polyethersulfone, nylon 6, and nylon 12.

Further, the organic solvent is one or more of methyl pyrrolidone, dimethylformamide, and acetone.

The present invention also provides a method for preparing a long-acting super-hydrophobic coating resistant to water pressure impact, which comprises the following steps: preparation of an array nanorod structure: mixing deionized water with a concentration of 10% to 37.5% of hydrochloric acid or mixing deionized water with sodium hydroxide, then adding a titanium source and/or a zinc source, stirring to be prepared into a mixed solution, which is added to the reaction kettle, and placing a conductive glass or a silicon wafer having a seed crystal of zinc oxide into the reaction kettle for hydrothermal reaction to prepare an array nanorod structure; wherein the hydrothermal time is 3 h to 12 h, the hydrothermal temperature is 100° C. to 180° C.; the preparation of the array nanopore structure: washing the aluminum plate in a mixed solution of ethanol and acetone, and polishing the cleaned substrate, anodizing to obtain a substrate having an array pore structure; Preparation of the micron network structure: dissolving the high molecular polymer in an organic solvent and constructing a micron network structure by electrostatic spinning or hot melt spraying on the prepared surface having the array structure, then heat treatment at 160° C. to 270° C. for 30 min to 240 min to improve the bonding force between the micro structure and the nano structure; wherein when preparing the nano network structure by the electrostatic spinning method, the voltage of the electrostatic spinning is 15000V to 30000V, and the time is 1 h to 5 h; when preparing the nano network structure by the hot melt spraying method, the temperature is between 150° C. to 250° C.; low surface energy treatment: immersing the prepared sample in a solution containing a low surface energy substance, and after a certain period of time of ultrasonic treatment, it is oven-dried to obtain a long-acting super-hydrophobic coating resistant to water pressure impact.

According to the long-acting super-hydrophobic coating resistant to water pressure impact and preparation method thereof of the present invention, by simulating the wing morphology of insects having strong hydrophobic stability in nature, constructing an array nanorod structure or an array nanopore structure on the surface of a substrate combing the hydrothermal method and the anodizing method, followed by constructing the micron network structure from the submicron-scale polymer fiber on the prepared array structure surface by use of electrostatic spinning and hot melt spraying method, and then heat treatment of the prepared multi-stage structure by high temperature welding method to sinter the micron-sized network structure and the nanoarray structure together. Finally, the prepared surface with stable multi-stage structure was treated by low surface energy substance, and a super-hydrophobic surface with strong stable gas film was successfully prepared. The super-hydrophobic coating has a special organic-inorganic nano-interpenetrating network structure, which greatly improves the stability of the multi-stage nano-micro structure, so that the super-hydrophobic coating surface has a good high-pressure water impact resistance and high pressure static water resistance.

DETAILED DESCRIPTION OF THE EMBODIMENTS

In order to make the objects, technical solutions and advantages of the present invention clear, the present invention will be further described in detail below by listing the following examples with reference to the accompanying drawings.

EXAMPLE 1

Pretreatment of the substrate surface: After mixing acetone, ethanol and deionized water in a ratio of 1:1:1, the substrate FTO glass was ultrasonically cleaned for 60 min, so that impurities such as grease and dust, etc. on the surface were removed, then it was taken out and naturally dried, and reserved for use.

Preparation of substrate with nano-array structure: 48 parts of deionized water, 48 parts of concentrated hydrochloric acid, and 4 parts of butyl titanate were subjected to hydrothermal treatment at 150° C. for 9 hours.

Preparation of micron network structure in surface layer: 15 parts of polyvinylidene fluoride (PVDF), 50 parts of dimethylformamide, 35 parts of acetone were electrostatic spun at a voltage of 25000 V for 90 min.

Thermochemical modification and heat treatment process of the substrate: the prepared substrate having the underlying array structure and surface layer network structure was immersed in a solution of 3 parts of fluorosilane in ethyl acetate, ultrasonically modified for 60 min, and then the substrate was heat treated at a treatment temperature of 180° C. for 90 min, then naturally cooled to room temperature to prepare the super-hydrophobic surface resistant to high pressure water impact, as shown in FIGS. 1A-1D.

Property Testing of the Super-Hydrophobic Surface

Figure 1A:
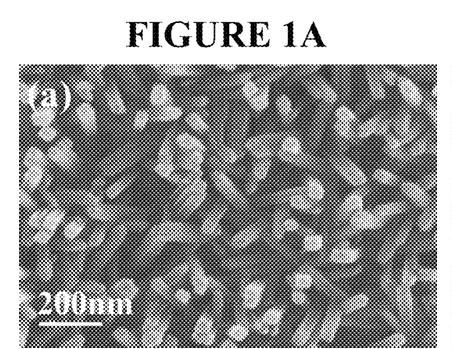
FIG. 1A is a scanning electron micrograph of the microstructure of a long-acting super-hydrophobic coating surface resistant to water pressure impact having a single layer of gas film prepared according to the present invention.
Figure 1B:
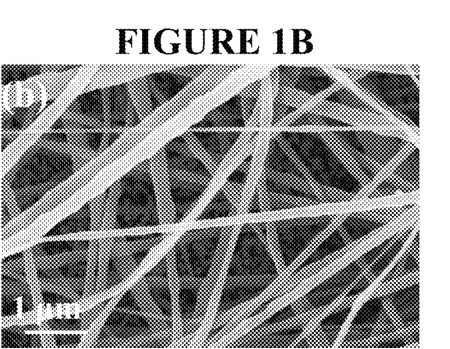
FIG. 1B is a scanning electron micrograph of the microstructure of a long-acting super-hydrophobic coating surface without heat treatment prepared according to the present invention and which has a multilayer of gas film and is resistant to water pressure impact.
Figure 1C:
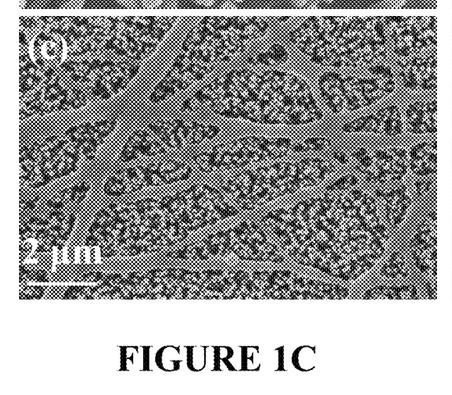
FIG. 1C is a scanning electron micrograph of the microstructure of a long-acting super-hydrophobic coating surface upon heat treatment prepared according to the present invention and which has a multilayer of gas film and is resistant to water pressure impact.
Figure 1D:
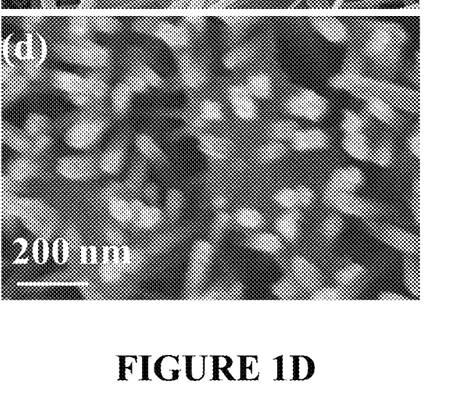
FIG. 1D is a partial enlarged view of FIG. 1C.
Figure 2:
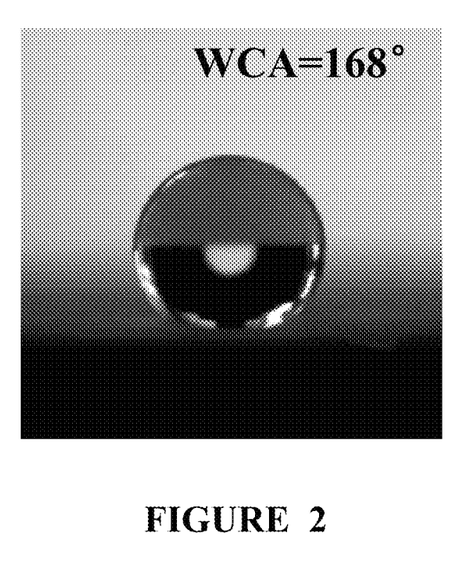
FIG. 2 is a graph showing the contact angle testing of a super-hydrophobic surface to water in Example 1 of the present invention.

Hydrophobic property: a drop of deionized water was applied to the surface of the substrate prepared in Example 1 using a 10 μL syringe, and the contact angle of the surface to water was measured by a JC2000A Type Static Hydrophobic Angle Measuring Instrument to be 167.0±2°. The test results were as shown in FIG. 2.

Figure 3:
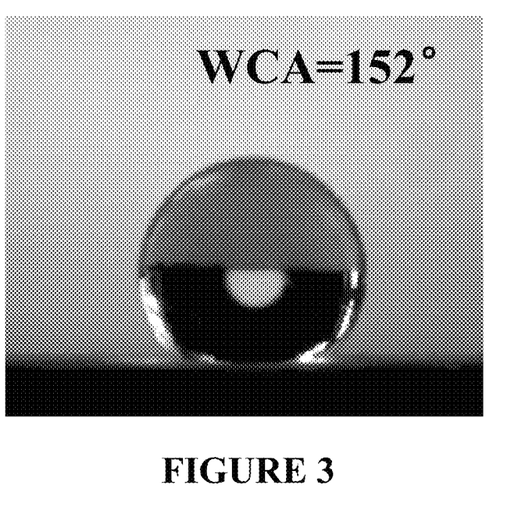
FIG. 3 is a graph showing the contact angle testing of a super-hydrophobic surface to water upon high pressure water impact in Example 1 of the present invention.

High pressure water impact resistance: The prepared super-hydrophobic surface was fixed at an angle of 45°, and the super-hydrophobic surface was continuously impacted with high pressure water column at 250 kPa for 10 min, 20 min, 30 min and 60 min, after which the morphology of the super-hydrophobic surface had no significant change, and the hydrophobic angle of the super-hydrophobic surface after 60 min of impact remained at 152.0±1.2°. It showed that the prepared super-hydrophobic surface has good high-pressure water impact resistance, as shown in FIG. 3.

Resistance to static high-pressure water wetting: The prepared super-hydrophobic surface was placed in a closed container, deionized water was added, and the closed container was pressurized with an air compressor to achieve a pressure of 3200 kPa in the closed container which is equivalent to a water depth of 30 meters. The closed container was allowed to stand for 1 hour, 2 hours, 3 hours and 6 hours, then the prepared super-hydrophobic surface was observed to be dry and not wetted by water. The test results showed that the prepared super-hydrophobic coating has excellent resistance to hydrostatic water wetting.

Figure 4:
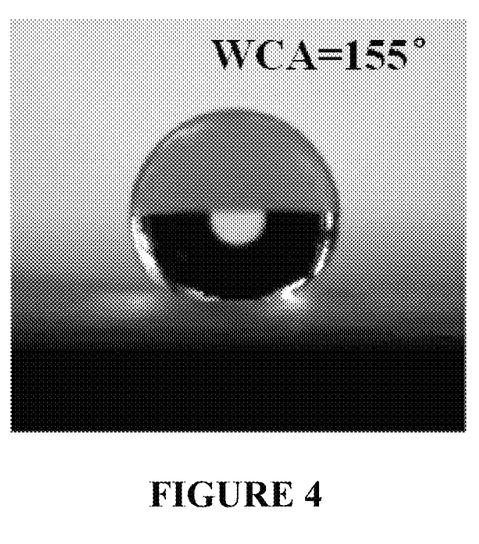
FIG. 4 is a graph showing the contact angle testing of a super-hydrophobic surface to hot water of 80° C. in Example 1 of the present invention.

Hot water resistance: The contact angle testing was carried out on the prepared super-hydrophobic surface with hot water of 40° C., 60° C., 80° C. and 100° C. respectively. The contact angles of the resulting coating to water of the above different temperatures were measured to be 166.0±1.5°, 161±1.5°, 155±1.5° and 151±1.5°. When the super-hydrophobic lotus leaf in nature is in contact with water above 50° C., the lotus leaf will lose its super-hydrophobic property. The test results showed that the super-hydrophobic surface has excellent hot water resistance, as shown in FIG. 4.

EXAMPLE 2

Pretreatment of the surface of the aluminum plate: the aluminum plate was placed in an ethanol solution for ultrasonic cleaning, so that impurities such as grease and dust, etc. on the surface were removed, and then the aluminum plate was immersed in an aqueous solution of sodium hydroxide having a mass fraction of 6% for a period of 5 min to remove the oxide film on the surface, then the aluminum sheet from which the oxide film was removed was washed with a large amount of deionized water and reserved for use.

Preparation of aluminum sheet with array porous structure: Primary oxidation was carried out with 95 parts of deionized water and 5 parts of oxalic acid at a voltage of 35 V for 3 hours, then the alumina sheet which was undergone the primary oxidation was ultrasonic treated with 6% of phosphoric acid solution for 30 min, which was then subjected to the secondary oxidation for 5 hours, the alumina sheet which was undergone the secondary oxidation was subjected to a pore-enlarging treatment with 1% of phosphoric acid solution, and the prepared sample was washed with a large amount of water and then oven-dried for use.

Preparation of micron network structure in surface layer: 100 parts of nylon 6 was hot melt sprayed at 200° C. for 1 min to prepare a fibrous-network structure.

Thermochemical modification and heat treatment process of the substrate: the prepared substrate having the underlying array pore structure and surface layer network structure was immersed in a solution of dimethicone in ethyl acetate, ultrasonically modified for 60 min, and then the substrate was heated vertically from top to bottom with a heat gun at a treatment temperature of 200° C. for 60 min, then naturally cooled to room temperature to prepare the super-hydrophobic surface resistant to high pressure water impact.

Property Testing of the Super-Hydrophobic Surface

Hydrophobic property: a drop of deionized water was applied to the surface of the substrate prepared in Example 2 using a 10 μL syringe, and the contact angle of the surface to water was measured by a JC2000A Type Static Hydrophobic Angle Measuring Instrument to be 168.0±2°.

High pressure water impact resistance: The prepared super-hydrophobic surface was fixed at an angle of 45°, and the super-hydrophobic surface was continuously impacted with high pressure water column at 250 kPa for 90 min, after which the morphology of the super-hydrophobic surface had no significant change, and the hydrophobic angle of the surface after 90 min of impact remained at 150.0±1.2°.

Resistance to static high-pressure water wetting: The prepared super-hydrophobic surface was placed in a closed container, deionized water was added, and the closed container was pressurized with an air compressor to achieve a pressure of 200 kPa in the closed container which is equivalent to a water depth of 20 meters. The closed container was allowed to stand for 6 hours, then the prepared super-hydrophobic surface was observed to be dry and not wetted by water. The test results showed that the prepared super-hydrophobic surface has excellent resistance to hydrostatic water wetting.

Hot water resistance: The contact angle testing was carried out on the prepared super-hydrophobic surface with hot water of 40° C., 60° C., 80° C. and 100° C. respectively. The contact angles of the resulting coating to water of the above different temperatures were measured to be 167.0±1.5°, 163±1.5°, 156±1.5° and 152±1.5°. The test results showed that the surface has excellent hot water resistance.

EXAMPLE 3

Pretreatment of the Substrate Surface:

After mixing acetone, ethanol and deionized water in a ratio of 1:1:1, the substrate ITO glass was ultrasonically cleaned for 60 min, so that impurities such as grease and dust, etc. on the surface were removed, then it was taken out and naturally dried, and reserved for use.

Preparation of substrate with nano-array structure: 60 parts of deionized water, 30 parts of concentrated hydrochloric acid, and 10 parts of titanium tetrachloride were subjected to hydrothermal treatment at 150° C. for 6 hours.

Preparation of micron network structure in surface layer: 10 parts of polysulfone, 60 parts of dimethylformamide, 30 parts of acetone were electrostatic spun at a voltage of 15000V for 60 min.

Thermochemical modification and heat treatment process of the substrate: the prepared substrate having the underlying array structure and surface layer network structure was immersed in a solution of perfluorooctanoic acid in water, ultrasonically modified for 60 min, and then the substrate was heat treated at a treatment temperature of 170° C. for 120 min, then naturally cooled to room temperature to prepare the super-hydrophobic surface resistant to high pressure water impact.

Property testing of the super-hydrophobic surface

Hydrophobic property: a drop of deionized water was applied to the surface of the substrate prepared in Example 3 using a 10 μL syringe, and the contact angle of the surface to water was measured by a JC2000A Type Static Hydrophobic Angle Measuring Instrument to be 165.0±2°.

High pressure water impact resistance: The prepared super-hydrophobic surface was fixed at an angle of 45°, and the super-hydrophobic surface was continuously impacted with high pressure water column at 250 kPa for 40 min, after which the morphology of the super-hydrophobic surface had no significant change, and the hydrophobic angle of the super-hydrophobic surface after 40 min of impact remained at 156.0±1.2°. It showed that the prepared super-hydrophobic surface has good high-pressure water impact resistance.

Resistance to static high-pressure water wetting: The prepared super-hydrophobic surface was placed in a closed container, deionized water was added, and the closed container was pressurized with an air compressor to achieve a pressure of 200 kPa in the closed container which is equivalent to a water depth of 20 meters. The closed container was allowed to stand for 10 hours, then the prepared super-hydrophobic surface was observed to be dry and not wetted by water. The test results showed that the prepared super-hydrophobic surface has excellent resistance to hydrostatic water wetting.

Hot water resistance: The contact angle testing was carried out on the prepared super-hydrophobic surface with hot water of 40° C., 60° C., 80° C. and 100° C. respectively. The contact angles of the resulting coating to water of the above different temperatures were measured to be 163.0±1.5°, 158±1.5°, 154±1.5° and 150±1.5°. When the super-hydrophobic lotus leaf in nature is in contact with water above 50° C., the lotus leaf will lose its super-hydrophobic property. The test results showed that the super-hydrophobic surface has excellent hot water resistance.

EXAMPLE 4

Pretreatment of the Substrate Surface:

The aluminum plate after being sanded with 800 mesh sandpaper was placed in a 1:1 mixed solution of acetone and ethanol for ultrasonic cleaning 60 min, so that impurities such as grease and dust, etc. on the surface were removed, and then the aluminum plate was immersed in an aqueous solution of sodium hydroxide having a mass fraction of 6% for a period of 5 min to remove the oxide film on the surface, then the aluminum sheet from which the oxide film was removed was washed with a large amount of deionized water and reserved for use.

Preparation of aluminum sheet with array porous structure: Primary oxidation was carried out with 90 parts of deionized water, 6 parts of sulfuric acid, and 4 parts of chromic acid at a voltage of 30V for 2 hours, then the alumina sheet which was undergone the primary oxidation was ultrasonic treated with 6% of phosphoric acid solution for 30 min, which was then subjected to the secondary oxidation for 6 hours, the alumina sheet which was undergone the secondary oxidation was subjected to a pore-enlarging treatment with 1% of phosphoric acid solution, and the prepared sample was washed with a large amount of water and then oven-dried for use.

Preparation of micron network structure in surface layer: 15 parts of polyethersulfone, 50 parts of dimethylformamide, 35 parts of acetone were electrostatic spun at a voltage of 20000 V for 90 min.

Thermochemical modification and heat treatment process of the substrate: the prepared substrate having the underlying array structure and surface layer network structure was immersed in a solution of stearic acid in ethanol, ultrasonically modified for 60 min, and then the substrate was heat treated at a treatment temperature of 200° C. for 60 min, then naturally cooled to room temperature to prepare the super-hydrophobic surface resistant to high pressure water impact.

Property Testing of the Super-Hydrophobic Surface

Hydrophobic property: a drop of deionized water was applied to the surface of the substrate prepared in Example 4 using a 10 μL syringe, and the contact angle of the surface to water was measured by a JC2000A Type Static Hydrophobic Angle Measuring Instrument to be 161.0±2°.

High pressure water impact resistance: The prepared super-hydrophobic surface was fixed at an angle of 45°, and the super-hydrophobic surface was continuously impacted with high pressure water column at 250 kPa for 40 min, after which the morphology of the super-hydrophobic surface had no significant change, and the hydrophobic angle of the super-hydrophobic surface after 30 min of impact remained at 151.0±1.2°. It showed that the prepared super-hydrophobic surface has good high-pressure water impact resistance.

Resistance to static high-pressure water wetting: The prepared super-hydrophobic surface was placed in a closed container, deionized water was added, and the closed container was pressurized with an air compressor to achieve a pressure of 700 kPa in the closed container which is equivalent to a water depth of 70 meters. The closed container was allowed to stand for 5 hours, then the prepared super-hydrophobic surface was observed to be dry and not wetted by water. The test results showed that the prepared super-hydrophobic surface has excellent resistance to hydrostatic water wetting.

Hot water resistance: The contact angle testing was carried out on the prepared super-hydrophobic surface with hot water of 40° C. and 60° C., respectively. The contact angles of the resulting coating to water of the above different temperatures were measured to be 158±1.5° and 150±1.5°.

EXAMPLE 5

Pretreatment of the Silicon Wafer Surface:

The silicon wafer was placed in a 1:1 mixed solution of acetone and ethanol for ultrasonic cleaning 5 min, so that impurities such as grease and dust, etc. on the surface were removed, and then the silicon wafer was taken out and blow-dried with nitrogen, and a layer of 0.005 mol/L of zinc acetate solution was coated on the silicon wafer and treated at 300° C. for 20 min, which was taken out after cooling for future use.

Preparation of substrate with nano-array structure: 50 parts of deionized water, 10 parts of sodium hydroxide, and 10 parts of zinc nitrate were subjected to hydrothermal treatment at 180° C. for 6 hours. and the prepared sample was washed with a large amount of water and then oven-dried for use.

Preparation of micron network structure in surface layer: 10 parts of polyvinylidene fluoride, 50 parts of dimethylformamide, 40 parts of acetone were electrostatic spun at a voltage of 30000 V for 90 min.

Thermochemical modification and heat treatment process of the substrate: the prepared substrate having the underlying array structure and surface layer network structure was immersed in a solution of fluorosilane in ethyl acetate, ultrasonically modified for 60 min, and then the substrate was heat treated with a heat gun at a treatment temperature of 200° C. for 30 min, then naturally cooled to room temperature to prepare the super-hydrophobic surface resistant to high pressure water impact.

Property Testing of the Super-Hydrophobic Surface

Hydrophobic property: a drop of deionized water was applied to the surface of the substrate prepared in Example 4 using a 10 μL syringe, and the contact angle of the surface to water was measured by a JC2000A Type Static Hydrophobic Angle Measuring Instrument to be 162.0±2°.

High pressure water impact resistance: The prepared super-hydrophobic surface was fixed at an angle of 45°, and the super-hydrophobic surface was continuously impacted with high pressure water column at 250 kPa for 50 min, after which the morphology of the super-hydrophobic surface had no significant change, and the hydrophobic angle of the super-hydrophobic surface after 40 min of impact remained at 153.0±1.2°. It showed that the prepared super-hydrophobic surface has good high-pressure water impact resistance.

Resistance to static high-pressure water wetting: The prepared super-hydrophobic surface was placed in a closed container, deionized water was added, and the closed container was pressurized with an air compressor to achieve a pressure of 200 kPa in the closed container which is equivalent to a water depth of 20 meters. The closed container was allowed to stand for 12 hours, then the prepared super-hydrophobic surface was observed to be dry and not wetted by water. The test results showed that the prepared super-hydrophobic surface has excellent resistance to hydrostatic water wetting.

Hot water resistance: The contact angle testing was carried out on the prepared super-hydrophobic surface with hot water of 40° C., 55° C. and 60° C., respectively. The contact angles of the resulting coating to water of the above different temperatures were measured to be 159±1.5°, 156±1.5° and 151±1.5°.

In conclusion, according to the long-acting super-hydrophobic coating resistant to water pressure impact and preparation method thereof of the present invention, by simulating the wing morphology of insects having strong hydrophobic stability in nature, constructing an array nanorod structure or an array nanopore structure on the surface of a substrate combing the hydrothermal method and the anodizing method, followed by constructing the micron network structure from the submicron-scale polymer fiber on the prepared array structure surface by use of electrostatic spinning and hot melt spray method, and then heat treatment the prepared multi-stage structure by high temperature welding method to sinter the micron-sized network structure and the nanoarray structure together. Finally, the prepared surface with stable multi-stage structure was treated by low surface energy substance, and a super-hydrophobic surface with strong stable gas film was successfully prepared. The super-hydrophobic coating has a special organic-inorganic nano-interpenetrating network structure, which greatly improves the stability of the multi-stage nano-micro structure, so that the super-hydrophobic coating surface has a good high-pressure water impact resistance and high-pressure static water resistance.

What is claimed is:

1. A long-acting super-hydrophobic coating resistant to water pressure impact, comprising:
    a conductive substrate; and
    raw materials in parts by weight: 1 part to 10 parts of a titanium source or 1 part to 10 parts of a zinc source, 40 parts to 100 parts of a deionized water, 20 parts to 50 parts of a hydrochloric acid or 20 parts to 40 parts of a sodium hydroxide, 1 part to 10 parts of an electrolyte, 1 part to 10 parts of a surface energy modifier, 10 parts to 20 parts of a molecular polymer, 1 part to 5 parts of a carbon nanotube and 70 parts to 100 parts of an organic solvent.

2. The long-acting super-hydrophobic coating resistant to water pressure impact in claim 1, wherein the raw materials in parts by weight are: 4 parts of the titanium source or 4 parts of the zinc source, 48 parts of the deionized water, 48 parts of the hydrochloric acid or 48 parts of the sodium hydroxide, 8 parts of the electrolyte, 3 parts of the surface energy modifier, 15 parts of the molecular polymer, 2 parts of the carbon nanotube and 85 parts of the organic solvent.

3. The long-acting super-hydrophobic coating resistant to water pressure impact in claim 1, wherein the raw materials in parts by weight are: 3 parts of the titanium source or 3 parts of the zinc source, 68 parts of the deionized water, 23 parts of the hydrochloric acid or 23 parts of the sodium hydroxide, 5 parts of the electrolyte, 7 parts of the surface energy modifier, 13 parts of the molecular polymer, 4 parts of the carbon nanotube and 78 parts of the organic solvent.

4. The long-acting super-hydrophobic coating resistant to water pressure impact in claim 1, wherein the conductive substrate comprises one of a FTO conductive glass, an ITO conductive glass, an aluminum sheet and a silicon wafer.

5. The long-acting super-hydrophobic coating resistant to water pressure impact in claim 2, wherein the conductive substrate comprises one of a FTO conductive glass, an ITO conductive glass, an aluminum sheet and a silicon wafer.

6. The long-acting super-hydrophobic coating resistant to water pressure impact in claim 3, wherein the conductive substrate comprises one of a FTO conductive glass, an ITO conductive glass, an aluminum sheet and a silicon wafer.

7. The long-acting super-hydrophobic coating resistant to water pressure impact in claim 1, wherein the surface energy modifier is at least one of a perfluorosilane, a perfluorooctanoic acid, a dimethicone, a tetradecanoic acid, a hexadecanoic acid, a stearic acid and an octadecylamine.

8. The long-acting super-hydrophobic coating resistant to water pressure impact in claim 2, wherein the surface energy modifier is at least one of a perfluorosilane, a perfluorooctanoic acid, a dimethicone, a tetradecanoic acid, a hexadecanoic acid, a stearic acid and an octadecylamine.

9. The long-acting super-hydrophobic coating resistant to water pressure impact in claim 3, wherein the surface energy modifier is at least one of a perfluorosilane, a perfluorooctanoic acid, a dimethicone, a tetradecanoic acid, a hexadecanoic acid, a stearic acid and an octadecylamine.

10. The long-acting super-hydrophobic coating resistant to water pressure impact in claim 1, wherein the titanium source comprises at least one of a titanium tetrachloride, a butyl titanate and a titanium isopropoxide; and wherein the zinc source comprises at least one of a zinc acetate and a zinc nitrate.

11. The long-acting super-hydrophobic coating resistant to water pressure impact in claim 2, wherein:
    the titanium source comprises at least one of a titanium tetrachloride, a butyl titanate and a titanium isopropoxide; and
    the zinc source comprises at least one of a zinc acetate and a zinc nitrate.

12. The long-acting super-hydrophobic coating resistant to water pressure impact in claim 3, wherein the titanium source comprises at least one of a titanium tetrachloride, a butyl titanate and a titanium isopropoxide; and wherein the zinc source comprises at least one of a zinc acetate and a zinc nitrate.

13. The long-acting super-hydrophobic coating resistant to water pressure impact in claim 1, wherein the electrolyte is at least one of a sulfuric acid, an oxalic acid and a chromic acid.

14. The long-acting super-hydrophobic coating resistant to water pressure impact in claim 2, wherein the electrolyte is at least one of a sulfuric acid, an oxalic acid and a chromic acid.

15. The long-acting super-hydrophobic coating resistant to water pressure impact in claim 3, wherein the electrolyte is at least one of a sulfuric acid, an oxalic acid and a chromic acid.

16. The long-acting super-hydrophobic coating resistant to water pressure impact in claim 1, wherein the molecular polymer comprises at least one of a polyvinylidene fluoride, a polysulfone, a polyethersulfone, a nylon 6 and a nylon 12.

17. The long-acting super-hydrophobic coating resistant to water pressure impact in claim 2, wherein the molecular polymer comprises at least one of a polyvinylidene fluoride, a polysulfone, a polyethersulfone, a nylon 6 and a nylon 12.

18. The long-acting super-hydrophobic coating resistant to water pressure impact in claim 3, wherein the molecular polymer comprises at least one of a polyvinylidene fluoride, a polysulfone, a polyethersulfone, a nylon 6 and a nylon 12.

19. The long-acting super-hydrophobic coating resistant to water pressure impact in claim 1, wherein the organic solvent is at least one of a methyl pyrrolidone, a dimethylformamide and an acetone.

20. The long-acting super-hydrophobic coating resistant to water pressure impact in claim 2, wherein the organic solvent is at least one of a methyl pyrrolidone, a dimethylformamide and an acetone.

21. The long-acting super-hydrophobic coating resistant to water pressure impact in claim 3, wherein the organic solvent is at least one of a methyl pyrrolidone, a dimethylformamide and an acetone.

* * * * *